United States Patent
Sugiura

(10) Patent No.: US 12,195,632 B2
(45) Date of Patent: Jan. 14, 2025

(54) OIL-BASED INKJET INK

(71) Applicant: RISO KAGAKU CORPORATION, Tokyo (JP)

(72) Inventor: Hikaru Sugiura, Ibaraki (JP)

(73) Assignee: RISO KAGAKU CORPORATION, Tokyo (JP)

( * ) Notice: Subject to any disclaimer, the term of this patent is extended or adjusted under 35 U.S.C. 154(b) by 251 days.

(21) Appl. No.: 17/377,921

(22) Filed: Jul. 16, 2021

(65) Prior Publication Data

US 2022/0033671 A1  Feb. 3, 2022

(30) Foreign Application Priority Data

Jul. 28, 2020 (JP) .................. 2020-127007

(51) Int. Cl.
| | |
|---|---|
| C09D 11/36 | (2014.01) |
| C09D 11/033 | (2014.01) |
| C09D 11/037 | (2014.01) |
| C09D 11/322 | (2014.01) |
| C09D 11/326 | (2014.01) |

(52) U.S. Cl.
CPC ............ *C09D 11/36* (2013.01); *C09D 11/033* (2013.01); *C09D 11/037* (2013.01); *C09D 11/322* (2013.01); *C09D 11/326* (2013.01)

(58) Field of Classification Search
CPC ..... C09D 11/36; C09D 11/033; C09D 11/037; C09D 11/322; C09D 11/326
See application file for complete search history.

(56) References Cited

U.S. PATENT DOCUMENTS

| | | | |
|---|---|---|---|
| 8,177,899 B2 | 5/2012 | Endo | |
| 9,845,402 B2 | 12/2017 | Shimura et al. | |
| 2007/0022904 A1 * | 2/2007 | Kitawaki | C09D 11/36 106/31.86 |
| 2010/0242795 A1 | 9/2010 | Endo | |
| 2011/0232528 A1 * | 9/2011 | Endo | C09D 11/322 106/31.86 |
| 2011/0315049 A1 * | 12/2011 | Aoki | C09D 11/322 106/31.86 |
| 2015/0231880 A1 | 8/2015 | Nagase et al. | |
| 2015/0353751 A1 * | 12/2015 | Umebayashi | C09D 11/107 428/207 |
| 2018/0171167 A1 * | 6/2018 | Thetford | B41M 7/0054 |
| 2020/0040206 A1 | 2/2020 | Sugiura | |

FOREIGN PATENT DOCUMENTS

| | | | |
|---|---|---|---|
| CN | 101845247 | 9/2010 | |
| CN | 107150500 | 9/2017 | |
| CN | 110461959 | 11/2019 | |
| CN | 110776784 | 2/2020 | |
| JP | 2000313835 A * | 11/2000 | |
| JP | 2010-215700 | 9/2010 | |
| JP | 2010215700 A * | 9/2010 | |
| JP | 2012-12432 | 1/2012 | |
| JP | 2015-150824 | 8/2015 | |
| JP | 2016147821 A * | 8/2016 | |
| WO | WO-2018181172 A1 * | 10/2018 | ........... C09D 11/033 |

OTHER PUBLICATIONS

ChemSpider, "Isocetyl Myristate", accessed Feb. 14, 2023, p. 1-2, https://www.chemspider.com/Chemical-Structure.13631158.html. (Year: 2023).*
Machine Translation for JP2016147821A ("Machine_Translation_Takanashi_JP_2016147821_A") (Year: 2016).*
Machine Translation for WO2018181172A1 ("Machine_Translation_Sugawara_WO_2018181172_A1") (Year: 2018).*
PubChem, "2-Octyldodecyl Myristate", accessed Feb. 14, 2023, p. 1-2, https://pubchem.ncbi.nlm.nih.gov/compound/2-Octyldodecyl-myristate (Year: 2023).*
Machine Translation for JP2010215700A ("Machine_Translation_Saito_JP_2010215700_A") (Year: 2010).*
"Isocetyl Myristate." ChemSpider, www.chemspider.com/Chemical-Structure.13631158.html. Accessed Dec. 9, 2023. (Year: 2023).*
English machine translation of JP-2016147821-A (Year: 2016).*
English machine translation of JP-2000313835-A (Year: 2000).*
The extended European search report issued for European Patent Application No. 21185781.8, Dec. 6, 2021, 5 pages.
Liping Zhou, "Chapter VI Environmental Protection Technologies in Manufacture of Ecological Textile Products, Manual for Latest Standards, Technical Applications, and Quality Control of Ecological Textile Products" Jun. 2004, p. 899; English translation provided.
Office Action issued for Chinese Patent Application No. 202110841879, Jun. 27, 2022, 12 pages including machine translation.

* cited by examiner

*Primary Examiner* — Jennifer A Smith
*Assistant Examiner* — Jeffrey Eugene Barzach
(74) *Attorney, Agent, or Firm* — HSML P.C.

(57) ABSTRACT

An oil-based inkjet ink is disclosed, that contains a pigment, a fatty acid ester-based solvent (A) having a viscosity of 5.0 mPa·s or lower and a boiling point of 300° C. or higher but lower than 400° C., and a fatty acid ester-based solvent (B) having a viscosity of 10.0 mPa·s or higher and a boiling point of 400° C. or higher.

15 Claims, No Drawings

OIL-BASED INKJET INK

CROSS REFERENCE TO RELATED APPLICATIONS

This application is based upon and claims the benefit of priority from the prior Japanese Patent Application No. 2020-127007, filed on Jul. 28, 2020, the entire contents of which are incorporated by reference herein.

BACKGROUND OF THE INVENTION

Field of the Invention

The present invention relates to an oil-based inkjet ink.

Description of the Related Art

The inkjet recording method is a method in which an inkjet ink of high fluidity is jetted from fine nozzles in the form of liquid droplets, thereby recording an image on a recording medium positioned facing the nozzles, and because this method enables high-speed printing to be conducted with little noise, it has rapidly become widespread in recent years. Examples of known types of inks that can be used in the inkjet recording method include aqueous inks which contain water as the main solvent, ultraviolet-curable inks (UV inks) which contain a large amount of a polymerizable monomer as the main component, hot melt inks (solid inks) which contain a large amount of a wax as the main component, and so-called non-aqueous inks which contain a non-aqueous solvent as the main solvent. Non-aqueous inks can be classified into solvent-based inks in which the main solvent is a volatile organic solvent, and oil-based inks in which the main solvent is an organic solvent having either low volatility or no volatility. Solvent-based inks mainly dry on the recording medium as a result of evaporation of the organic solvent, whereas oil-based inks mainly dry as a result of penetration into the recording medium.

Oil-based inks are inks of a penetration drying system, which dry as a result of penetration into the substrate. When continuous printing is performed using an oil-based ink, the ink applied to a substrate may adhere to a transport roller or the like before the ink has dried, and this ink may then be transferred to a subsequently transported substrate, causing contamination in the resulting printed item. This phenomenon is called transfer contamination.

Further, in printing with an oil-based ink, when the solvent penetrates into the substrate, the pigment may also be caused to penetrate into the inside of the substrate together with the solvent, and, as a result, the pigment remaining on the surface of the substrate may decrease, causing decrease in image density.

JP 2012-12432 A (hereafter, also referred to as Patent Document 1) propose the use of, in an oil-based ink, a solvent having a low polarity and a solvent having a high polarity in combination, and further a solvent for enhancing the compatibility of these solvents, in order to improve storage stability and jetting stability of the ink as well as penetration drying properties of the ink and to suppress the roller transfer contamination.

JP 2015-150824 A (hereafter, also referred to as Patent Document 2) proposes the use of, in a non-aqueous ink, a specific non-aqueous solvent, the standard boiling point of which is preferably 185° C. or lower, in order to record an image excellent in drying properties and abrasion resistance. It is disclosed in Patent Document 2 that since the non-aqueous ink that can be easily dried is used, preliminary jetting is performed to suppress clogging of nozzles. Further, in Patent Document 2, the non-aqueous ink is jetted onto a recording medium having low ink absorbency such as a polyvinyl chloride banner sheet, and the solvent in the non-aqueous ink is volatilized from the surface of the recording medium, and thereby an image is formed.

In Patent Document 1, the suppression of the roller transfer contamination is studied from the viewpoint of the polarity of the solvent. However, the stability of inks tends to lower when solvents having different polarities are used, and, thus, an improvement from another viewpoint may be an issue to be addressed.

In Patent Document 2, since a non-aqueous ink containing a highly volatile solvent is applied to a recording medium having low ink absorbency, the printing surface may come into contact with a transfer roller or the like before the solvent dries, thereby causing a roller transfer contamination. Further, in those cases where a non-aqueous ink containing a highly volatile solvent is applied to a substrate having permeability, the solvent tends to penetrate into the substrate, and, thus, the image density tends to decrease due to the influence of so-called "show-through".

In addition, in those cases where the penetration drying properties of an oil-based ink to the substrate is enhanced from the viewpoint of preventing transfer contamination, the pigment also tends to penetrate into the substrate together with the solvent, meaning the image density tends to decrease. Further, depending on the component balance of the oil-based ink, the ink applied onto the substrate may undergo wet spreading, causing image bleeding and deterioration in image quality.

It is an object of the present invention to prevent transfer contamination caused with a transfer member, and to provide printed items having a high quality image.

SUMMARY OF THE INVENTION

One of embodiments of the present invention provides an oil-based inkjet ink containing a pigment, a fatty acid ester-based solvent (A) having a viscosity of 5.0 mPa·s or lower and a boiling point of 300° C. or higher but lower than 400° C., and a fatty acid ester-based solvent (B) having a viscosity of 10.0 mPa·s or higher and a boiling point of 400° C. or higher.

DETAILED DESCRIPTION OF THE EMBODIMENTS

Embodiments of the present invention are described below. However, the examples in the following embodiments in no way limit the present invention.

The oil-based inkjet ink according to one of embodiments (hereafter, sometimes referred to as simply an "oil-based ink" or an "ink") contains a pigment, a fatty acid ester-based solvent (A) having a viscosity of 5.0 mPa·s or lower and a boiling point of 300° C. or higher but lower than 400° C., and a fatty acid ester-based solvent (B) having a viscosity of 10.0 mPa·s or higher and a boiling point of 400° C. or higher.

When this oil-based inkjet ink is used, the transfer contamination caused with a transfer member may be prevented and a printed item having a high quality image may be provided.

In the following description, the fatty acid ester-based solvent (A) having a viscosity of 5.0 mPa·s or lower and a boiling point of 300° C. or higher but lower than 400° C. is also referred to as simply a fatty acid ester-based solvent (A), and the fatty acid ester-based solvent (B) having a viscosity of 10.0 mPa·s or higher and a boiling point of 400° C. or higher is also referred to as simply a fatty acid ester-based solvent (B).

Since the fatty acid ester-based solvent (A) having a viscosity 5.0 mPa·s or lower and a boiling point 300° C. or higher but lower than 400° C. is a solvent having a low viscosity and a low boiling point, it may exhibit good penetration drying properties, and therefore, the occurrence of transfer contamination may be prevented. On the other hand, a solvent having a low viscosity and a low boiling point tends to evaporate to dry easily. When a certain period of time has elapsed after printing, the solvent inside the substrate may dry, and the substrate such as paper may become difficult to see through. Accordingly, the pigment which is inside the substrate and which used to be visible from the outside of the substrate tends to become difficult to see, and the surface density tends to decrease over time.

When the fatty acid ester-based solvent (A) and the fatty acid ester-based solvent (B) are used in combination, the evaporation drying of the fatty acid ester-based solvent (A) may be suppressed, and therefore, the decrease in the image density over time may be prevented. The fatty acid ester-based solvent (B) having a viscosity of 10.0 mPa·s or higher and a boiling point of 400° C. or higher exhibits a high viscosity. A solvent having a high viscosity tends to exhibit low penetration drying properties, and, therefore, the transfer contamination may easily occur. It is thought that when the fatty acid ester-based solvent (A) and the fatty acid ester-based solvent (B) are used in combination, the viscosity of the mixed solvent as a whole can be reduced, and the compatibility between the prevention of the decrease in the image density over time and the prevention of the transfer contamination may be enabled.

In this disclosure, the viscosity is a numerical value measured at 23° C. As the viscosity measuring apparatus, for example, "Rheometer MCR 302" manufactured by Anton Paar Japan K.K., can be used. The viscosity of the solvent, the viscosity of the ink and the viscosity of the supernatant liquid can be measured at 23° C. at a cone angle of 1° and a diameter of 50 mm. The boiling point of the solvent is a numerical value at 1 atmosphere.

The oil-based inkjet ink preferably contains a fatty acid ester-based solvent (A) having a viscosity of 5.0 mPa·s or lower and a boiling point of 300° C. or higher but lower than 400° C.

The fatty acid ester-based solvent (A) preferably has a viscosity of 5.0 mPa·s or lower. When the viscosity is within this range, the penetration drying properties may be improved, and the occurrence of the transfer contamination may be prevented. Further, the viscosity ratio of "supernatant liquid/ink", which is described below, may be adjusted to be a value within a more preferable range, and the fineness of the image may be further improved.

In order to reduce the viscosity of the ink itself, the viscosity of the fatty acid ester-based solvent (A) may be 4.0 mPa·s or lower. The lower limit of the viscosity of the fatty acid ester-based solvent (A) is not particularly limited, but is preferably 1.0 mPa·s or higher, and may be 2.0 mPa·s or higher. For example, the viscosity of the fatty acid ester-based solvent (A) is preferably from 1.0 to 5.0 mPa·s, and more preferably from 2.0 to 4.0 mPa·s.

The fatty acid ester-based solvent (A) preferably has a boiling point of 300° C. or higher but lower than 400° C.

The boiling point of the fatty acid ester-based solvent (A) is preferably 300° C. or higher. Within this range, the evaporation drying may proceed in a more gradual manner, and the decrease in the image density over time may be prevented. The boiling point of the fatty acid ester-based solvent (A) is preferably lower than 400° C., more preferably 380° C. or lower, and even more preferably 350° C. or lower. Within such a range, the evaporation drying properties may be enhanced, and the occurrence of the transfer contamination may be prevented. For example, the boiling point of the fatty acid ester-based solvent (A) is preferably 300° C. or higher but lower than 400° C., more preferably 300° C. or higher but 380° C. or lower, and even more preferably 300° C. or higher but 350° C. or lower.

The fatty acid ester-based solvent (A) is an esterified product of a fatty acid and an alcohol. The fatty acid may be a saturated or unsaturated fatty acid. The fatty acid is preferably a saturated fatty acid. The alcohol may be a monoalcohol, a monohydric alcohol or a dihydric or higher polyhydric alcohol. The alcohol is preferably a monohydric alcohol. The fatty acid ester-based solvent (A) is preferably liquid at 23° C.

Specific examples of the fatty acid ester-based solvent (A) include methyl myristate, ethyl myristate, propyl myristate, hexyl decanoate, heptyl decanoate, isooctyl nonanoate, heptyl nonanoate, isodecyl octanoate, octyl octanoate, nonyl octanoate, and decyl hexanoate.

More specific examples of the fatty acid ester-based solvent (A) include methyl myristate, ethyl myristate, propyl myristate, hexyl decanoate, heptyl decanoate, isooctyl nonanoate, 2-ethylhexyl nonanoate, 6-methylheptyl nonanoate, heptyl nonanoate, isodecyl octanoate, 2-propylheptyl octanoate, octyl octanoate, nonyl octanoate, and decyl hexanoate. One of these solvents may be contained in the ink alone or a combination of two or more of these solvents may be contained in the ink.

In this disclosure, "iso" is used as a prefix for a structure having a branch typified by a methyl branch or the like in an alkyl group portion.

Even more specific examples of the fatty acid ester-based solvent (A) include methyl myristate, hexyl decanoate, 2-propylheptyl octanoate, or a combination thereof.

The amount of the fatty acid ester-based solvent (A), relative to the total mass of ink, is preferably at least 30% by mass, more preferably at least 50% by mass, and even more preferably 60% by mass or greater. Within such a range, the occurrence of the transfer contamination may be further prevented.

The amount of the fatty acid ester-based solvent (A), relative to the total mass of ink, is preferably not more than 80% by mass, more preferably not more than 75% by mass, and even more preferably 70% by mass or less. Within such a range, the decrease in the image density over time may be further suppressed.

For example, the amount of the fatty acid ester-based solvent (A), relative to the total mass of ink, may be 30 to 80% by mass, 50 to 75% by mass, or 60 to 70% by mass.

The oil-based inkjet ink preferably contains a fatty acid ester-based solvent (B) having a viscosity of 10.0 mPa·s or higher and a boiling point of 400° C. or higher.

The fatty acid ester-based solvent (B) is a solvent having a high-viscosity and a high-boiling point. When the fatty acid ester-based solvent (B) is used in combination with the fatty acid ester-based solvent (A) which has a low-viscosity, the increase in the viscosity of the ink itself may be suppressed.

The viscosity of the fatty acid ester-based solvent (B) is preferably 10 mPa·s or higher, and more preferably 15 mPa·s or higher. The viscosity of the fatty acid ester-based solvent (B) is preferably 50 mPa·s or lower, and more preferably 40 mPa·s or lower. For example, the viscosity of the fatty acid ester-based solvent (B) is preferably from 10 to 50 mPa·s, and more preferably from 15 to 40 mPa·s.

The fatty acid ester-based solvent (B) preferably has a boiling point of 400° C. or higher.

The boiling point of the fatty acid ester-based solvent (B) is preferably 400° C. or higher, and more preferably 420° C. or higher. Within such a range, the decrease in the image density over time may be suppressed. The boiling point of the fatty acid ester-based solvent (B) is, in order to suppress any increase in the ink viscosity from the viewpoint of fluidity of the solvent itself, preferably 550° C. or lower, and more preferably 500° C. or lower, although the boiling point of the fatty acid ester-based solvent (B) is not limited to be within such a range. For example, the boiling point of the fatty acid ester-based solvent (B) is preferably from 400° C. to 550° C., and more preferably from 420° C. to 500° C.

The difference between the viscosity of the fatty acid ester-based solvent (A) and the viscosity of the fatty acid ester-based solvent (B) is preferably at least 5 mPa·s, and more preferably 10 mPa·s or greater. In such a range, the decrease in the image density over time may be further prevented, and the occurrence of the transfer contamination may also be further prevented.

The difference between the boiling point of the fatty acid ester-based solvent (A) and the boiling point of the fatty acid ester-based solvent (B) is preferably at least 10° C., more preferably at least 50° C., and even more preferably 80° C. or more. Within such a range, the decrease in the image density over time may be further prevented, and the occurrence of the transfer contamination may also be further prevented.

The fatty acid ester-based solvent (B) is an esterified product of a fatty acid and an alcohol. The fatty acid may be a saturated or unsaturated fatty acid. The fatty acid is preferably a saturated fatty acid. The alcohol may be a monoalcohol, a monohydric alcohol or a dihydric or higher polyhydric alcohol. The alcohol is preferably a monohydric alcohol. The fatty acid ester-based solvent (B) is preferably liquid at 23° C.

Specific examples of the fatty acid ester-based solvent (B) include cetyl isooctanoate, isocetyl laurate, isostearyl laurate, isoeicosyl laurate, isocetyl myristate, isostearyl myristate, isoeicosyl myristate, isooctyl palmitate, isostearyl palmitate, isooctyl stearate, and isocetyl stearate.

More specific examples of the fatty acid ester-based solvent (B) include cetyl isooctanoate, cetyl 2-ethylhexanoate, cetyl 6-methylheptanoate, isocetyl laurate, 16-methylpentadecyl laurate, 2-hexyldecyl laurate, isostearyl laurate, 2-heptylundecyl laurate, 16-methylheptadecyl laurate, isoeicosyl laurate, 18-methylnonadecyl laurate, 2-octyldodecyl laurate, isocetyl myristate, 16-methylpentadecyl myristate, 2-hexyldecyl myristate, isostearyl myristate, 2-heptylundecyl myristate, 16-methylheptadecyl myristate, isoeicosyl myristate, 18-methylnonadecyl myristate, 2-octyldodecyl myristate, isooctyl palmitate, 2-ethylhexyl palmitate, 6-methylheptyl palmitate, isostearyl palmitate, 2-heptylundecyl palmitate, 16-methylheptadecyl palmitate, 2-ethylhexyl stearate, 6-methylheptyl stearate, isocetyl stearate, 16-methylpentadecyl stearate, and 2-hexyldecyl stearate.

One of these solvents may be contained in the ink alone or a combination of two or more of these solvents may be contained in the ink.

Even more specific examples of the fatty acid ester-based solvent (B) include 2-octyldodecyl myristate, 2-ethylhexyl stearate, or a combination thereof.

For example, a combination of the fatty acid ester-based solvent (A) including methyl myristate, hexyl decanoate, 2-propylheptyl octanoate, or a combination thereof; and the fatty acid ester-based solvent (B) including 2-octyldodecyl myristate, 2-ethylhexyl stearate, or a combination thereof is preferable.

The amount of the fatty acid ester-based solvent (B), relative to the total mass of the ink, is preferably at least 1% by mass, more preferably at least 5% by mass, and even more preferably 10% by mass or greater. Within such a range, the decrease in the image density over time may be suppressed.

The amount of the fatty acid ester-based solvent (B), relative to the total mass of the ink, is preferably not more than 70% by mass, more preferably not more than 50% by mass, and even more preferably 30% by mass or less. Within such a range, the occurrence of the transfer contamination may be prevented.

For example, the amount of the fatty acid ester-based solvent (B), relative to the total mass of ink, may be 1 to 70% by mass, 5 to 50% by mass, 5 to 30% by mass, or 10 to 30% by mass.

The total amount of the fatty acid ester-based solvent (A) and the fatty acid ester-based solvent (B), relative to the total mass of the ink, is preferably from 20 to 95% by mass, more preferably from 50 to 95% by mass, and even more preferably 50 to 90% by mass.

The amount of the fatty acid ester-based solvent (B), relative to the total mass of the fatty acid ester-based solvent (A) and the fatty acid ester-based solvent (B), is preferably from 1 to 50% by mass, more preferably from 5 to 40% by mass, and even more preferably from 10 to 30% by mass.

In the oil-based ink according to one of embodiments, the viscosity at 23° C. of the supernatant liquid obtained by centrifuging the ink at a centrifugal force of 100,000 G for 5 minutes, relative to the viscosity at 23° C. of the ink, is preferably not more than 0.80. Hereafter, the viscosity at 23° C. of the supernatant liquid obtained by centrifuging the ink at a centrifugal force of 100,000 G for 5 minutes relative to the viscosity at 23° C. of the ink is also referred to as a viscosity ratio "supernatant liquid/ink".

In those cases in which the viscosity ratio "supernatant liquid/ink" is not more than 0.80, dots of the ink applied to the substrate may be less likely to spread on the substrate, and bleeding of the dots may be less likely to occur, and, therefore, a fine image can be formed. This may be effective for improving reproducibility of fine lines of characters, photographs, illustrations, and the like.

In those cases in which the viscosity ratio "supernatant liquid/ink" is not more than 0.80, in a process of application of the ink to the substrate and penetration of the solvent into the substrate, the difference between the viscosity of the ink component remaining on the surface of the substrate and the viscosity of the ink component penetrating into the substrate can be increased. The ink component remaining on the surface of the substrate contains a pigment, and may contain an optional component, such as a pigment dispersant, and/or a surfactant. The ink component penetrating into the substrate contains a fatty acid ester-based solvent (A), and a fatty acid ester-based solvent (B), and may contain an optional component such as another solvent.

It is thought that when the difference between the viscosity of the ink component remaining on the surface of the substrate and the viscosity of the ink component penetrating into the substrate is large, the solvent may promptly penetrate into the substrate while the pigment remains on the surface of the substrate but before the pigment undergoes wet spreading on the surface of the substrate, and, therefore, the spreading of dots on the surface of the substrate may be prevented.

When the difference between the viscosity of the ink component remaining on the surface of the substrate and the viscosity of the ink component penetrating into the substrate increases, the viscosity of the ink component remaining on the surface of the substrate tends to become higher and the penetration drying properties tend to decrease. Accordingly, the pigment remaining on the surface of the substrate may adhere to the transfer member inside the printing apparatus, and this pigment on the transfer member may then be adhere again to the subsequently transported substrate, causing transfer contamination. On the other hand, when the fatty acid ester-based solvent (A) is contained in the oil-based ink, the penetration drying properties may be enhanced and the occurrence of the transfer contamination may be prevented.

The viscosity ratio "supernatant liquid/ink" is preferably not more than 0.80, and more preferably 0.70 or less. Within such a range, the fineness of the image may be further improved. Specifically, the fine line reproducibility can be further improved. The lower limit value of the viscosity ratio "supernatant liquid/ink" is not particularly limited, but is preferably at least 0.40, and more preferably 0.50 or greater. Within such a range, the occurrence of the transfer contamination may be further prevented.

The viscosity ratio "supernatant liquid/ink" can be adjusted by, for example, the types and/or the amounts of components contained in the oil-based ink. Specifically, it may be effective to adjust the amount of the pigment, the viscosities and/or the amounts of the solvents and/or the like. When a pigment dispersant is contained in the oil-based ink, it may be effective to adjust the viscosity and/or the amount of the pigment dispersant. These factors may be combined to adjust the viscosity ratio.

The viscosity of the supernatant liquid after centrifugation can be measured by the following procedure.

The oil-based ink is centrifuged at a centrifugal force of 100,000 G for 5 minutes, and the supernatant liquid is taken out. The viscosity of the supernatant liquid is measured at 23° C. The viscosity of the ink is measured at 23° C. The viscosity ratio "supernatant liquid/ink" can be calculated from the measured viscosity of the supernatant liquid after centrifugation and the measured viscosity of the ink.

The oil-based inkjet ink may further contain a non-aqueous solvent other than the fatty acid ester-based solvent (A) and the fatty acid ester-based solvent (B), in addition to these solvents.

Non-polar organic solvents and polar organic solvents may both be used as this other non-aqueous solvent. In one of embodiments, a water-insoluble organic solvent that does not mix uniformly with an equal volume of water at 1 atmosphere and 20° C. is preferably used as the non-aqueous solvent.

Examples of these other non-aqueous solvents include non-polar organic solvents, examples of which include petroleum-based hydrocarbon solvents such as aliphatic hydrocarbon solvents, alicyclic hydrocarbon solvents and aromatic hydrocarbon solvents; and polar organic solvents, examples of which include higher alcohol-based solvents and higher fatty acid-based solvents. The oil-based ink may contain a fatty acid ester-based solvent other than the fatty acid ester-based solvent (A) and the fatty acid ester-based solvent (B).

Examples of the aliphatic hydrocarbon solvents and alicyclic hydrocarbon solvents include paraffin-based non-aqueous solvents, isoparaffin-based non-aqueous solvents, and naphthene-based non-aqueous solvents. Specific examples of preferred commercially available products include No. 0 Solvent L, No. 0 Solvent M, No. 0 Solvent H, Cactus Normal Paraffin N-10, Cactus Normal Paraffin N-11, Cactus Normal Paraffin N-12, Cactus Normal Paraffin N-13, Cactus Normal Paraffin N-14, Cactus Normal Paraffin N-15H, Cactus Normal Paraffin YHNP, Cactus Normal Paraffin SHNP, Isosol 300, Isosol 400, Teclean N-16, Teclean N-20, Teclean N-22, AF Solvent No. 4, AF Solvent No. 5, AF Solvent No. 6, AF Solvent No. 7, Naphtesol 160, Naphtesol 200 and Naphtesol 220 (all manufactured by JXTG Energy Corporation); and Isopar G, Isopar H, Isopar L, Isopar M, Exxsol D40, Exxsol D60, Exxsol D80, Exxsol D95, Exxsol D110 and Exxsol D130 (all manufactured by Exxon Mobil Corporation).

Examples of preferred aromatic hydrocarbon solvents include Grade Alkene L and Grade Alkene 200P (both manufactured by JXTG Energy Corporation), and Solvesso 100, Solvesso 150, Solvesso 200 and Solvesso 200ND (all manufactured by Exxon Mobil Corporation).

The initial boiling point of the petroleum-based hydrocarbon solvent is preferably at least 100° C., more preferably at least 150° C., and even more preferably 200° C. or higher. The initial boiling point can be measured in accordance with JIS K0066 "Test Methods for Distillation of Chemical Products".

Examples of preferred polar organic solvents include higher alcohol-based solvents, higher fatty acid-based solvents and other fatty acid ester-based solvents.

Examples of higher alcohol-based solvents include higher alcohol-based solvents having at least 6 carbon atoms, and preferably 12 to 20 carbon atoms, within one molecule. Specific examples of higher alcohol-based solvents include isomyristyl alcohol, isopalmityl alcohol, isostearyl alcohol, oleyl alcohol, isoeicosyl alcohol, decyltetradecanol and 1-octadecanol.

Examples of higher fatty acid-based solvents include higher fatty acid-based solvents having at least 12 carbon atoms, and preferably 14 to 20 carbon atoms, within one molecule. Specific examples of higher fatty acid-based solvents include lauric acid, isomyristic acid, palmitic acid, isopalmitic acid, α-linolenic acid, linoleic acid, oleic acid and isostearic acid.

Examples of other fatty acid ester-based solvents include fatty acid ester-based solvents having at least 13 carbon atoms, and preferably 16 to 30 carbon atoms, within one molecule. Specific examples of other fatty acid ester-based solvents include such as isononyl isononanoate, isodecyl isononanoate, methyl laurate, isopropyl laurate, hexyl laurate, isopropyl palmitate, methyl oleate, ethyl oleate, isopropyl oleate, butyl oleate, methyl linoleate, ethyl linoleate, isobutyl linoleate, butyl stearate, isopropyl isostearate, 2-octyldecyl neopentanoate and 2-octyldodecyl neopentanoate.

The boiling point of these polar organic solvents such as the fatty acid ester-based solvents, higher alcohol-based solvents, and higher fatty acid-based solvents is preferably at least 150° C., more preferably at least 200° C., and even more preferably 250° C. or higher.

When the above-mentioned other non-aqueous solvent is used in combination with the fatty acid ester-based solvent (A) and the fatty acid ester-based solvent (B), a nonpolar solvent is preferably used as the other non-aqueous solvent.

When the oil-based ink contains the above mentioned other non-aqueous solvent, the total amount of the fatty acid ester-based solvent (A) and the fatty acid ester-based solvent (B), relative to the total mass of the non-aqueous solvent, is preferably from 10 to 90% by mass, more preferably from 50 to 90% by mass, and even more preferably from 70 to 80% by mass.

The oil-based inkjet ink according to one of embodiments may contain a pigment.

Organic pigments such as azo pigments, phthalocyanine pigments, polycyclic pigments and dye lake pigments, and inorganic pigments such as carbon blacks and metal oxides may be used as the pigment. Examples of the azo pigments include soluble azo lake pigments, insoluble azo pigments and condensed azo pigments. Examples of the phthalocyanine pigments include metal phthalocyanine pigments such as copper phthalocyanine pigments and metal-free phthalocyanine pigments. Examples of the polycyclic pigments include quinacridone-based pigments, perylene-based pigments, perinone-based pigments, isoindoline-based pigments, isoindolinone-based pigments, dioxazine-based pigments, thioindigo-based pigments, anthraquinone-based pigments, quinophthalone-based pigments, metal complex pigments and diketopyrrolopyrrole (DPP). Examples of the carbon blacks include furnace carbon black, lamp black, acetylene black and channel black. Examples of the metal oxides include titanium oxide and zinc oxide. These pigments may be used individually, or a combination of two or more of these pigments may be used.

From the viewpoints of the jetting stability and the storage stability, the average particle size of the pigment particles, expressed as the volume-based average value in the particle size distribution measured by dynamic light scattering, is preferably not more than 300 nm, more preferably not more than 200 nm, even more preferably not more than 150 nm, and even more preferably 100 nm or less.

The amount of the pigment, relative to the total mass of the ink, is typically from 0.01 to 20% by mass, and from the viewpoints of the print density and the ink viscosity, is preferably from 1 to 15% by mass, and more preferably from 4 to 10% by mass.

In order to enable the pigment to be dispersed stably within the ink, a pigment dispersant may be used together with the pigment.

Examples of pigment dispersants that can be used favorably include hydroxyl group-containing carboxylate esters, salts of long-chain polyaminoamides and high-molecular weight acid esters, salts of high-molecular weight polycarboxylic acids, salts of long-chain polyaminoamides and polar acid esters, high-molecular weight unsaturated acid esters, copolymers of vinylpyrrolidone and long-chain alkenes, modified polyurethanes, modified polyacrylates, polyether ester anionic surfactants, polyoxyethylene alkyl phosphate esters, and polyester polyamines.

Examples of commercially available pigment dispersants include Antaron V216 (a vinylpyrrolidone-hexadecene copolymer) and Antaron V220 (a vinylpyrrolidone-eicosene copolymer) (both product names) manufactured by ISP Japan Ltd., Solsperse 13940 (a polyester amine-based dispersant), Solsperse 16000, Solsperse 17000 and Solsperse 18000 (fatty acid amine-based dispersants), and Solsperse 11200, Solsperse 24000 and Solsperse 28000 (all product names) manufactured by The Lubrizol Corporation; Efka 400, Efka 401, Efka 402, Efka 403, Efka 450, Efka 451 and Efka 453 (modified polyacrylates) and Efka 46, Efka 47, Efka 48, Efka 49, Efka 4010 and Efka 4055 (modified polyurethanes) (all product names) manufactured by BASF Japan Ltd.; DISPARLON KS-860 and DISPARLON KS-873N4 (polyester amine salts) (both product names) manufactured by Kusumoto Chemicals, Ltd.; DISCOL 202, DISCOL 206, DISCOL OA-202 and DISCOL OA-600 (multi-chain polymeric nonionic dispersants) (all product names) manufactured by DKS Co., Ltd.; DISPERBYK 2155 and DISPERBYK 9077 (both product names) manufactured by BYK-Chemie Japan K.K.; and Hypermer KD2, Hypermer KD3, Hypermer KD11 and Hypermer KD12 (all product names) manufactured by Croda Japan K.K.

The amount of the pigment dispersant need only be sufficient to enable satisfactory dispersion of the pigment within the ink, and may be set as appropriate. For example, the pigment dispersant is typically added in a mass ratio within a range from 0.1 to 5, and preferably from 0.3 to 1, relative to a value of 1 for the pigment. Further, the pigment dispersant may be added in an amount of 0.01 to 10% by mass, preferably 0.1 to 8% by mass, and even more preferably 1 to 8% by mass, relative to the total mass of the ink.

In addition to the various components described above, the oil-based ink may also contain one or more additives, provided these additives do not impair the effects of the present invention. Examples of additives which may be used as appropriate include nozzle blockage inhibitors, antioxidants, conductivity adjusters, viscosity adjusters, surface tension adjusters, and oxygen absorbers. From the viewpoint of the coloring of the ink, a dye may be contained in the ink together with the pigment. There are no particular limitations on the types of these additives, and materials typically used in this technical field may be used.

There are no particular limitations on the method used for producing this oil-based ink. In one method, the ink may be produced by mixing and stirring the components together, either in a single batch or in a number of separate batches. Specifically, the ink can be produced by dispersing all of the components in a dispersion device such as a beads mill, either in a single batch or in a number of separate batches, and then, if desired, passing the resulting dispersion through a filtration device such as a membrane filter.

The ideal range for the ink viscosity for use as an oil-based inkjet ink varies depending on factors such as the diameter of the nozzles within the jetting head and the jetting environment, but generally, the viscosity at 23° C. is preferably within a range from 5 to 30 mPa·s, more preferably from 5 to 15 mPa·s, and even more preferably from 8 to 13 mPa·s.

There are no particular limitations on the printing method used with the inkjet ink, and any of various printing systems, including a piezo system, electrostatic system or thermal system may be used. In those cases where an inkjet recording device is used, the ink according to one of embodiments of the present invention is preferably jetted from the inkjet head based on a digital signal, with the jetted ink droplets being adhered to a recording medium.

The ink according to one of embodiments has a low viscosity and may be suitable for the jetting from inkjet nozzles, and thus may be suitably jetted at normal temperature (23° C.).

In one of embodiments, there are no particular limitations on the substrate, and examples of substrates that can be used include printing papers such as plain papers, coated papers and specialty papers, cloth, inorganic sheets, films and OHP sheets, and adhesive sheets having one of the above substrates as a base material and having an adhesive layer provided on the rear surface. Among these, from the viewpoint of ink penetration, a permeable substrate is preferably used, and, in particular, a printing paper such as a plain paper or a coated paper can be used favorably.

Here, plain paper describes a normal paper in which an ink receiving layer or film layer or the like has not been formed on the surface of the paper. Examples of plain papers include high-quality papers, medium-quality papers, PPC papers, woody papers and recycled papers. In a plain paper, paper fibers with a thickness of several µm to several tens of µm are formed with a spacing between fibers of several tens to several hundred µm, and therefore the ink can penetrate readily.

In terms of coated papers, coated papers designed for inkjets, such as matte papers, glossy papers and semi-glossy papers, and other so-called coated printing papers can be used favorably. A coated printing paper describes the type of paper that has conventionally been used in relief printing, offset printing, and gravure printing and the like, and is a printing paper in which a coating layer is formed on the surface of a high-quality paper or medium-quality paper using a coating material containing an inorganic pigment such as clay or calcium carbonate and a binder such as starch. Depending on the amount applied of the coating material and the coating method used, coated printing papers are classified into fine coated papers, high-quality lightweight coated papers, medium-quality lightweight coated papers, high-quality coated papers, medium-quality coated papers, art papers, and cast coated papers and the like.

EXAMPLES

The present invention is described below in further detail using a series of examples. The present invention is in no way limited by the following examples.

[Preparation of Inks]

Ink formulations are shown in Table 1 and Table 2. The boiling point and the viscosity of each solvent are shown in the tables. The pigment, pigment dispersant and solvent were mixed together in accordance with the blend amounts shown in the tables, and the pigment was dispersed thoroughly using a beads mill (Dyno-Mill KDL-A (product name), manufactured by Shinmaru Enterprises Corporation) under conditions including a residence time of 15 minutes. Subsequently, coarse particles were removed using a membrane filter to obtain an ink.

The components used were as follows.
(Pigments)
  Carbon black MA77 (product name): manufactured by Mitsubishi Chemical Corporation
  FASTOGEN Blue LA 5380 (product name): manufactured by DIC Corporation (Pigment Dispersants)
  Solsperse 18000 (product name): manufactured by The Lubrizol Corporation, active ingredient: 100% by mass
  Solsperse 16000 (product name): manufactured by The Lubrizol Corporation, active ingredient: 100% by mass
(Solvents)
  Methyl myristate: an esterified product of myristic acid and methanol
  Hexyl decanoate: an esterified product of decanoic acid and hexanol
  2-Propylheptyl octanoate: "cetiol sensoft" (product name) manufactured by BASAF
  Octyldodecyl myristate: "ODM" (product name), manufactured by Kokyu Alcohol Kogyo Co., Ltd.
  2-Ethylhexyl stearate: "Excepari EH-S" (product name), manufactured by Kao Corporation
  Ethylhexyl isononanoate: "ES 108109" (product name), Manufactured by Higher Alcohol Industry Co., Ltd.
  Ethyl isostearate: "EIS-V" (product name), manufactured by Kokyu Alcohol Kogyo Co., Ltd.
  Petroleum-based hydrocarbon solvent: "Exxsol D130" (product name), manufactured by Exxon Mobil Corporation The viscosity values of the solvents shown in the tables are those measured at 23° C. using "Rheometer MCR 302" (product name) manufactured by Anton Paar Japan K.K., with a cone angle of 1° and a diameter of 50 mm.

The boiling points of the solvents shown in the tables are those at 1 atmosphere.

The viscosity ratio "supernatant liquid/ink" shown in the tables was obtained by the following procedure. First, the viscosity of the ink was measured. The ink was centrifuged at 23° C. under a centrifugal force of 100,000 G for 5 minutes, and the supernatant liquid was taken out. The viscosity of this supernatant liquid was measured.

The conditions for centrifugation are as follows.
  Ultracentrifuge: "himac CS 150 GX II" (product name) manufactured by Hitachi, Ltd.
  Rotor: S150AT
  Centrifugal force: 100,000 (G)
  Revolutions per minute: 50,000 (rpm)
  Turning radius: 3.58 (cm)
  Turning time: 5 (minutes)

From the obtained results, the viscosity ratio "supernatant liquid/ink" was calculated.

The viscosity of the ink and the viscosity of the supernatant liquid were measured at 23° C. using "Rheometer MCR 302" (product name) manufactured by Anton Paar Japan K.K., at a cone angle of 10 and a diameter of 50 mm.

The obtained viscosity ratio "supernatant liquid/ink" was evaluated against the following criteria. The results are shown in the tables.
  A: not more than 0.70
  B: more than 0.70 but not more than 0.80
  C. more than 0.80

[Evaluations]

With respect to the inks obtained in the above examples and comparative examples, evaluations were performed using the methods described below. The results of these evaluations are shown in the tables.

(Preparation of Printed Item)

Each of the inks obtained as described above was mounted in a line-type inkjet printer "ORPHIS-FW5230" (product name) (manufactured by RISO KAGAKU CORPORATION), and a printed item was obtained by performing single-color printing (a black and white image with a black ink, or a cyan single color image with a cyan ink) of a color chart (JEITA, standard pattern J8), under the color mode setting, onto a plain paper "RISO Paper Thin Type" (product name) (manufactured by RISO KAGAKU CORPORATION).

(Fine Line Reproducibility)

The character portion of the obtained printed item was visually observed, and the fine line reproducibility was evaluated against the following criteria.
  A: no bleeding is observed
  B: slight bleeding is observed
  C: significant bleeding is observed (Image Density over Time)

The obtained printed item was left to stand for one day, and, thereafter, the color of the solid image portion of this printed item was measured. Next, this printed item was left to stand for a further one week, and, thereafter, the color of the solid image portion of this printed item was measured. The image density over time was evaluated based on the difference (ΔOD) of the measured values, against the following criteria. A smaller difference (ΔOD) represents a smaller change in the image density, which is preferable.

A: ΔOD is less than 0.020
B: ΔOD is 0.020 or more but less than 0.030.
C: ΔOD is 0.030 or more (Prevention of Transfer Contamination)

Printing of 1,000 copies of the color chart described above was performed, and thereafter, one piece of paper was passed under the setting of printing a blank sheet, and contamination on the blank sheet was visually observed. The transfer contamination was evaluated against the following criteria.

A: no contamination visible
B: contamination slightly visible
C: contamination clearly visible

TABLE 1

Ink Formulation and Evaluation Results

| Unit: % by mass | | Boiling point [° C.] | Viscosity [mPa · s] | Examples | | | | | | | | |
|---|---|---|---|---|---|---|---|---|---|---|---|---|
| | | | | 1 | 2 | 3 | 4 | 5 | 6 | 7 | 8 | 9 |
| Pigment | Carbon Black MA 77 | | | 10.00 | 10.00 | 10.00 | 10.00 | 10.00 | 8.00 | 10.00 | 10.00 | — |
| | FASTOGEN Blue LA 5380 | | | — | — | — | — | — | — | — | — | 10.00 |
| Pigments dispersant | Solsperse 18000 | | | 8.00 | 8.00 | 8.00 | 8.00 | 8.00 | 6.40 | 8.00 | 8.00 | — |
| | Solsperse 16000 | | | — | — | — | — | — | — | — | — | 8.00 |
| Solvent | Methyl myristate | 305 | 3.4 | 62.00 | 62.00 | — | — | — | 65.60 | 77.00 | 57.00 | 62.00 |
| | Hexyl decanoate | 315 | 4.0 | — | — | 62.00 | — | — | — | — | — | — |
| | 2-Propylheptyl octanoate | 320 | 4.9 | — | — | — | 62.00 | 42.00 | — | — | — | — |
| | Octyldodecyl myristate | 400≤ | 15≤ | 20.00 | — | 20.00 | 20.00 | 20.00 | 20.00 | 5.00 | 25.00 | 20.00 |
| | 2-Ethylhexyl stearate | 400≤ | 15≤ | — | 20.00 | — | — | — | — | — | — | — |
| | Ethylhexyl isononanoate | 290 | 4.5 | — | — | — | — | — | — | — | — | — |
| | Ethyl isostearate | 360 | 9.2 | — | — | — | — | — | — | — | — | — |
| | Petroleum-based hydrocarbon solvent | 295 | 5.1 | — | — | — | — | 20.00 | — | — | — | — |
| Total (% by mass) | | | | 100.00 | 100.00 | 100.00 | 100.00 | 100.00 | 100.00 | 100.00 | 100.00 | 100.00 |
| Viscosity ratio "supernatant liquid/ink" | | | | A | A | A | A | A | B | A | A | A |
| Fine line reproducibility | | | | A | A | A | A | A | B | A | A | A |
| Image density over time | | | | A | A | A | A | A | A | B | A | A |
| Prevention of transfer contamination | | | | A | A | A | A | A | A | A | B | A |

TABLE 2

Ink Formulation and Evaluation Results

| Unit: % by mass | | Boiling point [° C.] | Viscosity [mPa · s] | Comparative Example | | | | |
|---|---|---|---|---|---|---|---|---|
| | | | | 1 | 2 | 3 | 4 | 5 |
| Pigment | Carbon Black MA 77 | | | 10.00 | 10.00 | 10.00 | 10.00 | 10.00 |
| | FASTOGEN Blue LA 5380 | | | — | — | — | — | — |
| Pigment dispersant | Solsperse 18000 | | | 8.00 | 8.00 | 8.00 | 8.00 | 8.00 |
| | Solsperse 16000 | | | — | — | — | — | — |
| Solvent | Methyl myristate | 305 | 3.4 | 82.00 | — | — | 62.00 | — |
| | Hexyl decanoate | 315 | 4.0 | — | — | — | — | — |
| | 2-Propylheptyl octanoate | 320 | 4.9 | — | — | — | — | — |
| | Octyldodecyl myristate | 400≤ | 15≤ | — | 82.00 | 20.00 | — | 20.00 |
| | 2-Ethylhexyl stearate | 400≤ | 15≤ | — | — | — | — | — |
| | Ethylhexyl isononanoate | 290 | 4.5 | — | — | 62.00 | — | — |
| | Ethyl isostearate | 360 | 9.2 | — | — | — | 20.00 | 62.00 |
| | Petroleum-based hydrocarbon solvent | 295 | 5.1 | — | — | — | — | — |
| Total (% mass) | | | | 100.00 | 100.00 | 100.00 | 100.00 | 100.00 |
| Viscosity ratio "supernatant liquid/ink" | | | | A | C | A | A | C |
| Fine line reproducibility | | | | A | C | A | A | C |
| Image density over time | | | | C | A | C | C | A |
| Prevention of transfer contamination | | | | A | C | A | A | C |

As shown in the tables, each of the inks of the Examples exhibits favorable results in each of the fine line reproducibility, the image density over time, and the prevention of transfer contamination. Further, each of the inks of the Examples has a viscosity suitable for inkjet printing and exhibits favorable jetting performance.

In Examples 1 to 4, the combination of the fatty acid ester-based solvent (A) and the fatty acid ester-based solvent (B) was changed, and each of these Examples showed favorable results. It is understood from Example 5 that good results can be obtained even when a petroleum-based hydrocarbon solvent is additionally contained in the ink. It is understood from Example 6 that when the viscosity ratio "supernatant liquid/ink" is not more than 0.80, and preferably 0.70 or less, the fine line reproducibility is further improved.

It is understood from Example 7 that when the amount of the fatty acid ester-based solvent (B), which has a high boiling point, is at least 5% by mass, preferably 10% by mass or more, the image density over time is further improved. It is understood from Example 8 that when the amount of the fatty acid ester-based solvent (A), which has a low boiling point, is at least 50% by mass, preferably 60% by mass or greater, the transfer contamination is further prevented. It is understood from Example 9 that good results may be obtained independently of the type of pigment and pigment dispersant.

Comparative Example 1 is an example in which the ink contains only a fatty acid ester-based solvent (A), which has a low boiling point, and showed poor results in the evaluation of the image density over time. Comparative Example 2 is an example in which the ink contains only a fatty acid ester-based solvent (B), which has a high boiling point, and showed poor results in the prevention of transfer contamination and in the fine line reproducibility. Comparative Example 3 is an example in which a fatty acid ester-based solvent (B) is combined with a fatty acid ester-based solvent having a low boiling point and a low viscosity, and showed poor results in the evaluation of the image density over time.

Comparative Example 4 is an example in which a fatty acid ester-based solvent (A) is combined with a fatty acid ester-based solvent having a low boiling point and a high viscosity, and showed poor results in the image density over time. Comparative Example 5 is an example in which a fatty acid ester-based solvent (B) and a fatty acid ester-based solvent having a low boiling point and a high viscosity are combined, and showed poor results in the fine line reproducibility and the prevention of transfer contamination.

It is to be noted that, besides those already mentioned above, many modifications and variations of the above embodiments may be made without departing from the novel and advantageous features of the present invention. Accordingly, all such modifications and variations are intended to be included within the scope of the appended claims.

What is claimed is:

1. An oil-based inkjet ink comprising:
   a pigment,
   a fatty acid ester-based solvent (A) having a viscosity of 5.0 mPa·s or lower and a boiling point of 300° C. or higher but lower than 400° C., and
   a fatty acid ester-based solvent (B) having a viscosity of 10.0 mPa·s or higher and a boiling point of 400° C. or higher,
   wherein the fatty acid ester-based solvent (A) comprises at least one solvent selected from the group consisting of methyl myristate, ethyl myristate, propyl myristate, heptyl decanoate, isooctyl nonanoate, 2-ethylhexyl nonanoate, 6-methylheptyl nonanoate, heptyl nonanoate, isodecyl octanoate, 2-propylheptyl octanoate, octyl octanoate, nonyl octanoate, and decyl hexanoate, and
   wherein the amount of the fatty acid ester-based solvent (B), relative to the total mass of the fatty acid ester-based solvent (A) and the fatty acid ester-based solvent (B), is from 1 to 40% by mass.

2. The oil-based inkjet ink of claim 1, wherein the fatty acid ester-based solvent (A) comprises at least one solvent selected from the group consisting of methyl myristate, ethyl myristate, propyl myristate, heptyl decanoate, isooctyl nonanoate, heptyl nonanoate, isodecyl octanoate, octyl octanoate, nonyl octanoate, and decyl hexanoate.

3. The oil-based inkjet ink according to claim 1, wherein the fatty acid ester-based solvent (B) comprises at least one solvent selected from the group consisting of cetyl isooctanoate, isocetyl laurate, isostearyl laurate, isoeicosyl laurate, isocetyl myristate, isostearyl myristate, isoeicosyl myristate, isooctyl palmitate, isostearyl palmitate, isooctyl stearate and isocetyl stearate.

4. The oil-based inkjet ink according to claim 1, wherein a viscosity at 23° C. of a supernatant liquid obtained by centrifuging the oil-based inkjet ink at a centrifugal force of 100,000 G for 5 minutes, relative to a viscosity at 23° C. of the oil-based inkjet ink, is not more than 0.70.

5. The oil-based inkjet ink according to claim 1, wherein the amount of the fatty acid ester-based solvent (A), relative to the total mass of ink, is from 30 to 80% by mass.

6. The oil-based inkjet ink according to claim 1, wherein the amount of the fatty acid ester-based solvent (B), relative to the total mass of ink, is from 5 to 30% by mass.

7. The oil-based inkjet ink according to claim 1, wherein the amount of the fatty acid ester-based solvent (B), relative to the total mass of the fatty acid ester-based solvent (A) and the fatty acid ester-based solvent (B), is from 1 to 30% by mass.

8. The oil-based inkjet ink according to claim 1, wherein the difference between the viscosity of the fatty acid ester-based solvent (A) and the viscosity of the fatty acid ester-based solvent (B) is at least 10 mPa·s.

9. The oil-based inkjet ink according to claim 1, wherein the difference between the boiling point of the fatty acid ester-based solvent (A) and the boiling point of the fatty acid ester-based solvent (B) is at least 10° C.

10. The oil-based inkjet ink according to claim 1, wherein the boiling point of the fatty acid ester-based solvent (B) is from 420 to 500° C.

11. The oil-based inkjet ink according to claim 1, wherein the fatty acid ester-based solvent (A) comprises methyl myristate, 2-propylheptyl octanoate, or a combination thereof.

12. The oil-based inkjet ink according to claim 1, wherein the fatty acid ester-based solvent (B) comprises 2-octyldodecyl myristate, 2-ethylhexyl stearate, or a combination thereof.

13. An oil-based inkjet ink comprising:
    a pigment,
    a fatty acid ester-based solvent (A) having a viscosity of 5.0 mPa·s or lower and a boiling point of 300° C. or higher but lower than 400° C., and
    a fatty acid ester-based solvent (B) having a viscosity of 10.0 mPa·s or higher and a boiling point of 400° C. or higher,
    wherein,
    the fatty acid ester-based solvent (A) comprises methyl myristate, 2-propylheptyl octanoate, or a combination thereof, and the fatty acid ester-based solvent (B) comprises 2-octyldodecyl myristate, 2-ethylhexyl stearate, or a combination thereof.

14. The oil-based inkjet ink according to claim 2, wherein the fatty acid ester-based solvent (B) comprises at least one solvent selected from the group consisting of cetyl isooctanoate, isocetyl laurate, isostearyl laurate, isoeicosyl laurate, isocetyl myristate, isostearyl myristate, isoeicosyl myristate, isooctyl palmitate, isostearyl palmitate, isooctyl stearate and isocetyl stearate.

15. The oil-based inkjet ink according to claim 1, wherein a viscosity at 23° C. of a supernatant liquid obtained by centrifuging the oil-based inkjet ink at a centrifugal force of 100,000 G for 5 minutes, relative to a viscosity at 23° C. of the oil-based inkjet ink, is not more than 0.80.

* * * * *